(12) United States Patent
Piaton

(10) Patent No.: US 10,243,417 B2
(45) Date of Patent: Mar. 26, 2019

(54) ELECTRIC MOTOR HAVING A LOW SHORT-CIRCUIT TORQUE, DRIVE DEVICE WITH A PLURALITY OF MOTORS AND METHOD FOR PRODUCING SUCH A MOTOR

(71) Applicant: SAGEM DEFENSE SECURITE, Boulogne Billancourt (FR)

(72) Inventor: Jerome Piaton, Boulogne Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 397 days.

(21) Appl. No.: 14/782,159

(22) PCT Filed: Apr. 2, 2014

(86) PCT No.: PCT/EP2014/056631
§ 371 (c)(1),
(2) Date: Oct. 2, 2015

(87) PCT Pub. No.: WO2014/161911
PCT Pub. Date: Oct. 9, 2014

(65) Prior Publication Data
US 2016/0049833 A1 Feb. 18, 2016

(30) Foreign Application Priority Data

Apr. 5, 2013 (FR) ...................................... 13 53101

(51) Int. Cl.
*H02K 1/12* (2006.01)
*H02K 15/02* (2006.01)
(Continued)

(52) U.S. Cl.
CPC ............... *H02K 1/12* (2013.01); *H02K 15/02* (2013.01); *H02K 15/03* (2013.01); *H02K 16/00* (2013.01);
(Continued)

(58) Field of Classification Search
CPC ........ H02K 21/02; H02K 21/14; H02K 16/02; H02K 16/00; H02K 15/02; H02K 15/03;
(Continued)

(56) References Cited

U.S. PATENT DOCUMENTS 3,822,390 A * 7/1974 Janson ................... B65H 59/04
310/104
5,323,078 A 6/1994 Garcia
(Continued)

FOREIGN PATENT DOCUMENTS

CN 1409459 A * 4/2003 ............. H02K 1/246
EP 0 549 427 A1 6/1993
(Continued)

OTHER PUBLICATIONS

English translation of CN 1409459, accessed Nov. 8, 2017 from Espacenet website, <http://translationportal.epo.org/emtp/translate/?ACTION=description-retrieval&COUNTRY=CN&ENGINE=google&FORMAT=docdb&KIND=A&LOCALE=en_EP&NUMBER=1409459&OPS=ops.epo.org/3.2&SRCLANG=zh&TRGLANG=en>.*

(Continued)

*Primary Examiner* — Jeremy A Luks
(74) *Attorney, Agent, or Firm* — Muncy, Geissler, Olds & Lowe, P.C.

(57) ABSTRACT

A magnet motor has a stator formed from a laminated core provided with windings to form phases and a rotor provided with magnets distributed angularly around at least one section of the rotor and pivotably received in the housing of (Continued)

the stator. The stator has a length greater than a length of said section of the rotor and the rotor is provided with at least one ring made from magnetic material that adjoins said section and is received in the housing of the stator. A drive device having a plurality of motors and a method for producing such a motor are also provided.

10 Claims, 1 Drawing Sheet

(51) Int. Cl.
    *H02K 15/03*     (2006.01)
    *H02K 16/00*     (2006.01)
    *H02K 16/02*     (2006.01)
    *H02K 21/02*     (2006.01)
    *H02K 21/14*     (2006.01)

(52) U.S. Cl.
    CPC ............ *H02K 16/02* (2013.01); *H02K 21/02* (2013.01); *H02K 21/14* (2013.01); *H02K 2213/03* (2013.01); *H02K 2213/06* (2013.01); *H02K 2213/12* (2013.01)

(58) Field of Classification Search
    CPC .. H02K 1/12; H02K 2213/03; H02K 2213/06; H02K 2213/12
    USPC ........... 310/46, 152, 156.01, 156.03, 156.07, 310/156.74, 183, 190
    See application file for complete search history.

(56) References Cited

U.S. PATENT DOCUMENTS

| | | | |
|---|---|---|---|
| 6,047,461 A | | 4/2000 | Miura et al. |
| 6,563,246 B1* | | 5/2003 | Kajiura ............... B60K 6/26 310/114 |
| 2004/0217665 A1* | | 11/2004 | Hans ............... H02K 16/00 310/156.47 |
| 2010/0252341 A1* | | 10/2010 | Shu ............... H02K 16/02 180/65.21 |
| 2013/0270952 A1* | | 10/2013 | Jurkovic ............ H02K 1/2766 310/156.01 |

FOREIGN PATENT DOCUMENTS

| | | |
|---|---|---|
| EP | 0 549 428 A1 | 6/1993 |
| FR | 2 768 271 A1 | 3/1999 |

OTHER PUBLICATIONS

English translation of EP 0549427, accessed Nov. 8, 2017 from Espacenet website, <http://translationportal.epo.org/emtp/translate/?ACTION=description-retrieval&COUNTRY=EP&ENGINE=google&FORMAT=docdb&KIND=A1&LOCALE=en_EP&NUMBER=0549427&OPS=ops.epo.org/3.2&SRCLANG=fr&TRGLANG=en>.*

* cited by examiner

ELECTRIC MOTOR HAVING A LOW SHORT-CIRCUIT TORQUE, DRIVE DEVICE WITH A PLURALITY OF MOTORS AND METHOD FOR PRODUCING SUCH A MOTOR

BACKGROUND OF THE INVENTION

Field of the Invention

The present invention relates to an electric motor having a low short-circuit torque that is of particular benefit for use in a drive device with a plurality of motors driving the same element.

Brief Discussion of the Related Art

A magnet motor generally comprises a rotor provided with magnets and a stator formed from a bundle of sheets surrounded by electric circuits in the form of coils forming electric phases allowing the motor to be controlled.

Some drive devices comprise a first motor and a second motor, which are connected to the same element so as to be able to both drive this element independently of one another. The rotors of the two motors may be connected to the same shaft for this purpose.

In a normal operating mode only the first motor is controlled so as to drive the element, the second motor being used only in the event of failure of the first motor.

This redundancy makes the operation of the drive device more reliable, to the detriment however of a relatively significant mass of the drive device.

In addition, some failures of the motor or of the control electronics thereof may cause the motor to exert a braking force. The motors therefore must be dimensioned so as to be able to compensate for this braking force produced by the faulty motor. In particular, when the faulty motor has a short-circuit between phases, the driving of the element by the other motor causes the rotation of the rotor of the faulty motor, which in turn induces in the short-circuit phases a current that cannot be eliminated and results in the appearance of a resisting torque.

The motors therefore must be dimensioned so as to be able to displace individually the element whilst taking into account not only external stresses exerted on the element, but also the resisting torque that would be produced by a faulty motor. The motors therefore must be able to produce a greater torque, which increases the cost, bulk and mass of said motors.

It is recalled that the maximum short-circuit torque $C_{CC}$ has a value of $C_{CC}=3/2 \cdot K^2/(2p \cdot (L-M))$ and appears at the speed $V=R/(p \cdot (L-M))$ with a gradient $p=3/2 \cdot K^2/R$, in which K is the coefficient of phase/neutral torque, p is the number of pairs of poles, L is the inductance of the motor, M is the mutual phase/neutral inductance, and R is the phase/neutral resistance.

In order to limit this torque it is known to increase the resistance of the coils in order to increase the speed of rotation of the rotor at which the maximum torque appears. This solution is therefore only conceivable for motors functioning at low speed. This also increases the losses by Joule effect, degrading the performance of the motor and necessitating a cooling of the motor.

SUMMARY OF THE INVENTION

One object of the invention is to propose a magnet motor having a low short-circuit torque between phases.

To this end, in accordance with the invention, a magnet motor is proposed, comprising a stator formed from a bundle of sheets provided with coils to form phases and a rotor provided with magnets distributed angularly around at least a portion of the rotor and received pivotally in a housing of the stator. The housing of the stator has a length greater than a length of said portion of the rotor, and the rotor is provided with at least one ring made of magnetic material, which adjoins said portion and is received in the housing of the stator.

Thus, the ring made of magnetic material increases the inductance of the motor, which makes it possible to decrease the maximum short-circuit torque. The arrangement of the invention is extremely advantageous because the low short-circuit torque is obtained without modification of the structure of the stator and therefore without modification of the industrial equipment used for production thereof. The same is true for the general structure of the rotor. The motor of the invention therefore is not much more costly to produce than a conventional motor.

The invention also relates to a drive device comprising at least two motors, of which at least is of the aforementioned type, the two motors being connected to the same element to be moved.

The motor of the aforementioned type is used in a normal operating mode to drive the element to be moved. In the case of a short circuit between phases, the maximum short-circuit torque being low, the other motor is dimensioned primarily only on the basis of the torque necessary to drive the element to be moved. The drive device of the invention is therefore lighter and less bulky on the whole than the drive devices having a plurality of conventional motors.

The invention also relates to a method for producing such a motor. This method comprises the steps of producing the stator, of mounting the magnets on the rotor, and of mounting a ring made of magnetic material on the rotor, the stator and the ring having a length selected on the basis of a desired inductance of the motor, and the ring having an outer surface selected on the basis of a desired reluctance of the motor.

Further features and advantages of the invention will become clear upon reading the following description of particular non-limiting embodiments of the invention.

BRIEF DESCRIPTION OF THE DRAWINGS

Reference will be made to the accompanying drawings, in which.

DETAILED DESCRIPTION OF THE PREFERRED EMBODIMENTS

Figure 1:
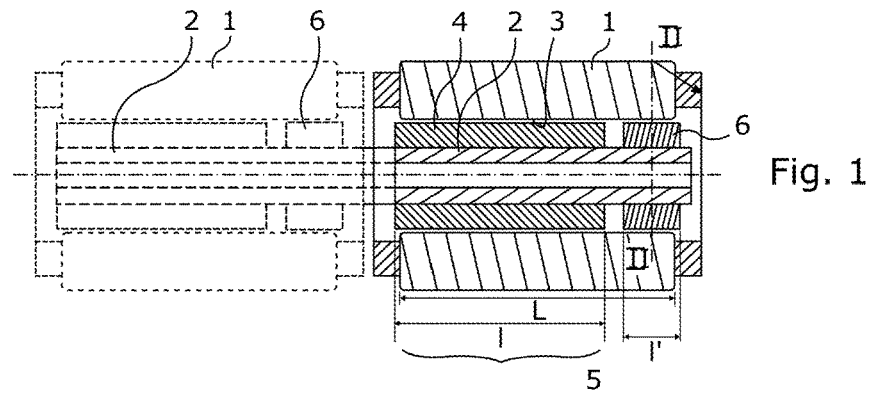
FIG. 1 is a schematic view, in longitudinal section, of a motor in accordance with a first embodiment of the invention.

With reference to the drawings a motor according to the invention comprises a stator 1 formed, as is conventional, from a bundle of sheets provided with coils to form phases and a rotor 2 received pivotally in a housing 3 of the stator 1. The rotor 2 is provided with magnets 4 distributed angularly around at least a portion 5 of the rotor 2. The overall structure of the magnet motor is known and therefore will not be discussed here in greater detail.

In accordance with the invention the housing 3 of the stator 1 has a length L greater than a length l of said portion 5 of the rotor 2.

The rotor 2 is provided with at least one ring 6 made of magnetic material, which adjoins said portion 5 and is received in the housing 3 of the stator 1. The ring 6 is in this case made of iron or of a magnetic alloy, such as an alloy comprising iron and silicon or iron and cobalt, for example.

The length L of the housing 3 of the stator 1 and the length l' of the ring 6 are determined so as to have a suitable inductance so that the motor has the lowest possible maximum short-circuit torque whilst delivering a performance suitable for its future use.

The air-gap between the ring 6 and the stator 1 is substantially identical to the minimal air-gap between the magnets of the rotor 2 and the stator 1. The ring 6 thus allows an increase of the inductance compared with a motor devoid of such a ring. Providing an identical air-gap on the one hand between the ring 6 and the stator 1 and on the other hand between the magnets and the stator 1 also facilitates the production of the motor.

Figure 2:
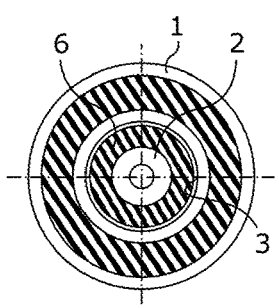
FIG. 2 is a cross-sectional view, along the line II-II, of this motor.

With reference to FIGS. 1 and 2, and in accordance with the first embodiment, the rotor 2 comprises just one portion 5 and the ring 6 is placed beside one of the ends of the portion 5.

The ring 6 here has a smooth outer surface. The smooth surface does not create any salience effect.

Figure 3:
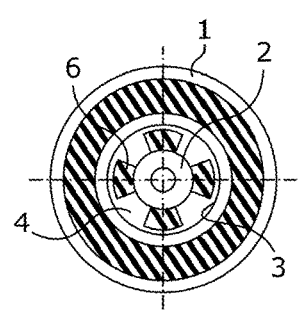
FIG. 3 is a view similar to FIG. 2 of a variant of the first embodiment.

In a variant of FIG. 3 the ring 6 has a toothed outer surface. The ring 6 here has a cross section having a notched contour.

The toothed outer surface makes it possible to create a reluctance effect able to produce a torque by means of a suitable control of the motor. This may be useful in some applications.

It goes without saying that the teeth of the ring 6 may have parallel, converging, or diverging flanks depending on the desired reluctance effect.

In FIG. 1 dashed lines show a second motor for forming a drive device with two identical motors having rotors 2 connected to the same output shaft 7 connected to the element to be moved. The motors are connected to a control unit 10, known per se, which is designed so that a single one of the motors is powered and drives the output shaft 7 in a normal operating mode.

The elements identical or similar to those described previously will bear the same reference numeral in the following description of the second and third embodiments.

Figure 4:
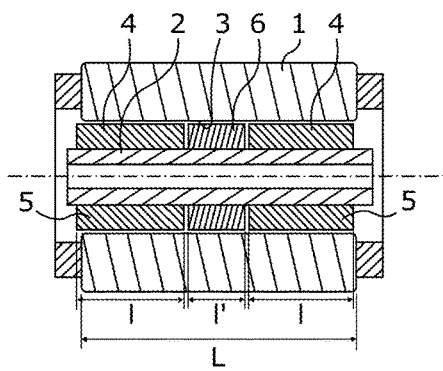
FIG. 4 is a view similar to FIG. 1 of a motor in accordance with a second embodiment.

With reference to FIG. 4, and in accordance with the second embodiment, the rotor 2 comprises two portions 5 provided with magnets 4, and the ring 6 is mounted between the two portions 5.

Figure 5:
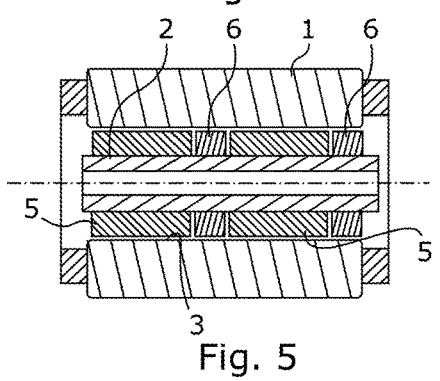
FIG. 5 is a view similar to FIG. 1 of a motor in accordance with the third embodiment.

With reference to FIG. 5, and in accordance with the third embodiment, the rotor 2 comprises two portions 5 provided with magnets 4, and a ring 6 is mounted between the two portions 5.

A second ring 6 made of magnetic material is mounted at an end of one of the portions 5.

Figure 6:
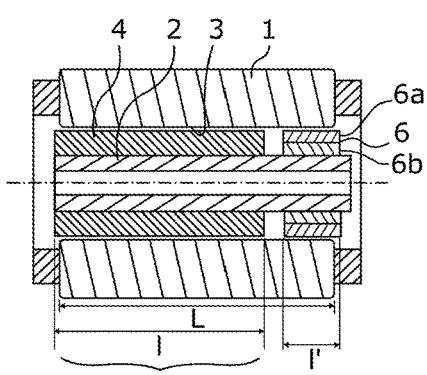
FIG. 6 is a view similar to FIG. 1 of a motor in accordance with a fourth embodiment.

In all the embodiments the arrangement of the ring or rings 6 on the rotor 2 is preferably provided so as to limit the risk of magnetic leakage at the magnets. For this purpose a space is provided, in the longitudinal direction, between the ring or rings 6 and the magnets, this space being greater than the air-gap between the magnets and the stator. The air-gap is preferably equal to twice this air-gap. Alternatively or in addition, as illustrated in FIG. 6 the ring or each ring 6 is formed in two coaxial annular parts, i.e. an outer part 6a made of magnetic material and an inner part 6b, which therefore is in contact with the rotor 2 and is made of a non-magnetic material. The thickness of the inner part 6b is greater than the air-gap between the magnets and the stator.

The motor of the first embodiment is produced in accordance with the following method.

The production method according to the invention comprises the steps of:
producing the stator 1,
mounting the magnets 4 on the portion 5 of the rotor 2,
mounting the ring 6 made of magnetic material on the rotor 2.

During the method, the lengths L and l' of the housing 3 of the stator 1 and of the ring 6 respectively are selected on the basis of a desired inductance of the motor.

In addition, the ring 6 has an outer surface selected on the basis of a desired inductance of the motor.

Of course, the invention is not limited to the described embodiments, but includes any variant within the field of the invention as defined by the claims.

In particular the drive device may comprise more than two motors. Of these motors only some may be equipped with at least one ring 6, the others being devoid of such a ring. In this latter case the control unit is designed such that the motor or motors equipped with a ring is/are used in a normal operating mode, the other motors being used in the event of a failure.

The rotors of the motors of the drive device may be connected directly to the element to be moved or may be connected directly to the same shaft, or may be connected to these by a movement transmission means.

A motor may comprise more than two rings 6.

The invention claimed is:

1. A magnet motor, comprising
   a stator formed from a bundle of sheets provided with coils to form phases; and
   a rotor provided with magnets distributed angularly around at least a portion of the rotor and received pivotally in a housing of the stator,
   wherein the stator has a length greater than a length of said portion of the rotor,
   wherein the rotor is provided with at least one ring made of magnetic material, which adjoins said portion and is received in the housing of the stator, the at least one ring not being a magnet and making it possible to have a low short-circuit torque, and an air-gap between the ring and the stator being substantially identical to the minimal air-gap between the magnets and the stator, and
   wherein a non-magnetic space is disposed in the longitudinal direction between the at least one ring and the magnets, the non-magnetic space being larger than an air gap between the magnets and the stator.

2. The motor as claimed in claim 1, wherein the ring has a smooth outer surface.

3. The motor as claimed in claim 1, wherein the ring has a toothed outer surface.

4. The motor as claimed in claim 1, wherein the rotor comprises two portions provided with magnets, and the ring is mounted between the two portions.

5. The motor as claimed in claim 4, wherein a second ring made of magnetic material is mounted at an end of one of the portions.

6. The motor as claimed in claim 1, wherein the ring is made of iron or a magnetic alloy.

7. The motor as claimed in claim 1, wherein the ring is formed in two coaxial annular parts, the two coaxial annular parts including an outer coaxial annular part made of magnetic material and an inner coaxial annular part in contact with the rotor and made of non-magnetic material, the inner coaxial annular part having a thickness greater than an air-gap between the magnets and the stator.

8. A drive device comprising at least two motors, of which at least one is formed in accordance with claim 1, the rotors of the motors being connected to the same element to be moved.

9. The device as claimed in claim 8, wherein the rotors of the motors are connected to the same shaft.

10. A method for producing a motor as claimed in claim 1, comprising the steps of producing the stator, mounting the magnets on the rotor, and mounting a ring made of magnetic material on the rotor, the stator and the ring having a length selected on the basis of a desired inductance of the motor, and the ring having an outer surface selected on the basis of a desired reluctance of the motor.

\* \* \* \* \*